United States Patent Office 3,290,371
Patented Dec. 6, 1966

3,290,371
PROCESS FOR RENDERING UREA ANTI-CAKING
Dennis Godfrey Brooke and Peter Evans, Norton-on-Tees, England, assignors to Imperial Chemical Industries Limited, London, England, a corporation of Great Britain
No Drawing. Filed Nov. 21, 1963, Ser. No. 325,491
Claims priority, application Great Britain, Sept. 14, 1959, 31,204/59; July 8, 1960, 23,899/60
4 Claims. (Cl. 260—555)

This invention relates to urea in particulate form, for example crystalline urea and is a continuation-in-part of our application Serial No. 55,176, filed September 12, 1960, now abandoned.

Particulate urea, especially crystalline urea, has in general the disadvantage that it does not flow or run freely except when thoroughly dried, it quickly loses its free-flowing properties and tends to cake into a mass, particularly when being transported or stored in bulk. The object of this invention is to improve such properties.

According to the present invention there is provided a process of coating urea particles to improve free-flowing properties and resistance to caking which comprises providing a quantity of uncoated solid urea particles, maintaining said uncoated urea particles at a temperature above 50° C. but below their melting point while applying a vapour of a lower aldehyde or ketone particularly formaldehyde, acetaldehyde or acetone thereto by simple addition and mixing to thereby uniformly distribute said vapour throughout said quantity of urea particles and coat uniformly said urea particles with a thin layer of from about 0.05% to 0.5% by weight of said vapour of a low molecular weight condensate.

The terms "lower aldehyde" and "ketone" used in this specification are to be understood to include volatile and moderately volatile substances containing aldehydic or ketonic carbonyl groups, i.e. aldehydes and ketones boiling at temperatures up to about 200° C. such as formaldehyde, acetaldehyde, acetone, cyclohexanone, benzaldehyde, heptaldehyde, salicylaldehyde, p-tolualdehyde, and furfural. Low volatility materials such as aldoses, piperanol and vanillin although effective are not included. Although we do not wish to limit this invention by any theoretical explanation, it is believed that in each case an aldehyde or ketone condenses with the urea to form a thin layer of a low molecular weight condensate e.g. up to a molecular weight of 500 and preferably not more than 200, and that this layer shields the urea particles from ingress and egress of water thereby reducing caking and maintaining the particles in a free-flowing condition. Thus the present invention is in contrast with proposals such as that of Japanese Patent No. 180,046 in which a shell or crust of high molecular weight polymer is formed round urea to reduce its solubility and allow its use as a slow release fertilizer; in the present invention the thin layer formed is soluble and does not materially affect the solubility or solution properties of the urea.

The aldehyde or ketone is coated onto the particulate urea at any temperature above 50° C. up to the melting point of the urea particles by simple addition and mixing, by which is meant that the vapour is brought into contact with the urea particles and mixed therewith conveniently in the presence of a diluent gas e.g. by passing a stream of the vapour in a diluent gas through a bed of the particles. The use of acid catalysts to produce a high molecular weight coating is not included in the invention.

When the aldehyde or ketone is a volatile liquid such as acetaldehyde or acetone it may if desired be added as such by spraying it at a controlled rate on to hot particulate urea while the latter is being agitated in suitable apparatus, for example in a paddle mixer. The aldehyde or ketone vapourises and is thereby brought into contact with the urea.

As a particular feature of the present invention an agitated mass of particulate urea, for example, crystalline urea, is contacted with the vapour of aldehyde or ketone. The time needed to produce the desired thin low molecular weight layer of condensate is for example up to about 30 minutes. Preferably the aldehyde or ketone is brought into contact with the particulate urea while the latter is hot, for example at a temperature in the range of 50° C. to 100° C.

By the expression "agitated mass" is to be understood the condition of solid particles when subjected to substantially continuous movement in suitable apparatus, for example in a paddle or other type of mixer, or in a fluidised bed.

When using formaldehyde vapour according to the above-mentioned particular feature of the present invention, the vapour may conveniently be obtained by distillation of commercial formalin or by heating paraformaldehyde by means of a metal or oil bath. The vapour may conveniently be dispersed in one or more streams of air which are passed through the apparatus in which the urea is being agitated. By thus ensuring efficient distribution of the vapour it has been found that the quantity of formaldehyde which is generally sufficient for satisfactory results is less than 0.1% by weight of the urea.

Vapours of normally liquid aldehydes, for example acetaldehyde, n-heptaldehyde, benzaldehyde and furfural, and of normally liquid ketones, for example acetone and cyclohexanone, may be similarly employed, that is by distilling the liquid and dispersing the resulting vapour in one or more streams of air which are then introduced into the apparatus in which the particulate urea is being agitated.

The invention is illustrated by the following examples.

Example 1

2 kilograms of substantially crystalline urea, of size grading such that 70% by weight comprised particles greater than 250μ, were agitated in a steam-jacketed paddle mixer maintained at 100° C. and formaldehyde vapour obtained by distillation of commercial formalin was passed through the mixer over a period of one hour.

The resulting urea, in substantially unaltered form when compared with untreated urea after three days storage in bottles, exhibited substantially no tendency to cake, whereas the untreated urea had caked hard.

Example 2

The following Table 1 shows in the second column the "caking index" of samples of crystalline urea as received from a synthesis plant, and in the third column the "caking index" of samples from the same batches after being contacted with the vapour of the aldehyde or ketone mentioned in the first column. The liquid aldehyde or ketone was distilled and the resulting vapour, dispersed in a stream of air, was introduced into a mixer in which the crystalline urea was being agitated at a temperature in the range of 70° C. to 80° C. The contact time was 30 minutes and the amount of aldehyde or ketone taken up by the urea was substantially 0.5% by weight in each case.

Corresponding samples of 500 gm. each of the untreated and treated urea were stored in glass bottles for the same period of time and the "caking index" was determined on the basis of the number of blows of substantially equal magnitude that it was necessary to impart to each bottle, after being inverted, to disintegrate the mass of crystalline urea therein to a substantially free-flowing condition.

TABLE 1

| | | |
|---|---|---|
| Acetaldehyde | 14 | 0 |
| Heptaldehyde | 18 | 0 |
| Furfural | 18 | 0 |
| Benzaldehyde | 14 | 0 |
| Acetone | 11 | 0 |
| Cyclohexanone | 8 | 1 |

*Example 3*

The following Table 2 shows results obtained from tests in which 0.1% by weight of the liquid or solid aldehyde mentioned in the first column was mixed with crystalline urea at a temperature in the range of 70° C. to 80° C., the mixing being continued for 30 minutes after the addition of the aldehyde.

The figures in the second and third columns of the table have the same significance respectively as those in the corresponding columns of Table 1 of Example 2. It is to be understood however, that the variation in the figures given in the second column is due to the actual physical condition of the particular batch of crystalline urea as received from the synthesis plant.

TABLE 2

| | | |
|---|---|---|
| n-Heptaldehyde | 6 | 0 |
| Do | 14 | 0 |
| Salicylaldehyde | 6 | 0 |
| Do | 14 | 0–1 |
| p-Tolualdehyde | 6 | 2 |
| Do | 14 | 2 |

*Example 4*

The presence of an aldehyde or ketone was provided in several quantities of crystalline urea as shown in the following Table 3, and the quantities of urea so treated were stored in bags of 1 cwt. each under a stack of 20 filled bags of like capacity for a period of two months.

The formaldehyde mentioned was generated by heating paraformaldehyde, using a metal bath, as the gas dispersed in a stream of air which passed through a mixer in which the urea was being agitated. The other aldehydes and the acetone were added in their normally liquid or solid state to the respective quantities of urea while the latter was subjected to the intensive mixing. The temperature of the urea in all cases was in the range 70° C. to 80° C.

In Table 3 the second column gives the amount of aldehyde or ketone provided, as percent by weight of the urea, and the third column gives the "caking tendency" which is assessed on the scale of 0 to 10 representing the range from completely free-flowing material without any lumps, to material which had caked into a solid mass and could not be broken up by dropping from a height of three feet.

TABLE 3

| | | |
|---|---|---|
| Formaldehyde | 0.1 | 2 |
| Do | 0.5 | 1 |
| Acetaldehyde | 0.1 | 6 |
| Do | 0.5 | 3 |
| n-Heptaldehyde | 0.1 | 7 |
| Furfural | 0.1 | 7 |
| Do | 0.5 | 6 |
| Benzaldehyde | 0.1 | 9 |
| Do | 0.5 | 5 |
| Acetone | 0.1 | 4 |
| Do | 0.5 | 3 |

We claim:

1. A process of coating urea particles to improve free-flowing properties and resistance to caking which comprises agitating a quantity of uncoated solid urea particles, maintaining said uncoated urea particles at a temperature above 50° C. but below their melting point while applying under non-acid conditions from about 0.05% to 0.5% by weight of a vapour of a carbonyl compound selected from the group consisting of formaldehyde, acetaldehyde, acetone, cyclohexanone, benzaldehyde, heptaldehyde, salicylaldehyde, p-tolualdehyde, and furfural thereto by simple addition and mixing to thereby uniformly distribute said vapour throughout said quantity of urea particles and coat uniformly said urea particles with a thin, soluble layer of a low molecular weight condensate and recovering the coated urea particles.

2. A process according to claim 1 in which the vapour is dispersed in a stream of diluent gas and thereby brought into contact with and mixed with the urea particles.

3. A process according to claim 2 in which the vapour, dispersed in a diluent gas, is passed through an agitated mass of the urea.

4. A process according to claim 1 in which the low molecular weight condensate has a molecular weight of not more than 500.

References Cited by the Examiner

FOREIGN PATENTS 180,046   8/1949   Japan.

ALEX MAZEL, *Primary Examiner.*

H. R. JILES, *Examiner.*